(12) United States Patent
George-Fowler et al.

(10) Patent No.: US 11,835,164 B2
(45) Date of Patent: Dec. 5, 2023

(54) CORD CUFF FOR SECURING AN END OF A CORD

(71) Applicants: Trevor George-Fowler, Tehachapi, CA (US); Ronald Warren Firestone, Santa Barbara, CA (US)

(72) Inventors: Trevor George-Fowler, Tehachapi, CA (US); Ronald Warren Firestone, Santa Barbara, CA (US)

( * ) Notice: Subject to any disclaimer, the term of this patent is extended or adjusted under 35 U.S.C. 154(b) by 0 days.

(21) Appl. No.: 17/105,324

(22) Filed: Nov. 25, 2020

(65) Prior Publication Data
US 2022/0049796 A1    Feb. 17, 2022

Related U.S. Application Data

(60) Provisional application No. 63/065,391, filed on Aug. 13, 2020.

(51) Int. Cl.
*F16L 3/10* (2006.01)

(52) U.S. Cl.
CPC .................... *F16L 3/1058* (2013.01)

(58) Field of Classification Search
CPC .................................................. F16L 3/1058
USPC ............................................................. 24/48
See application file for complete search history.

(56) References Cited

U.S. PATENT DOCUMENTS

| | | | | |
|---|---|---|---|---|
| 3,516,631 A * | 6/1970 | Santucci | .................. | H02G 3/32 24/304 |
| 4,002,349 A * | 1/1977 | Dopp | .................. | A63C 11/021 401/35 |
| D270,329 S * | 8/1983 | Hardy | ........................... | D8/356 |
| 5,474,268 A * | 12/1995 | Yu | ........................ | F16L 33/035 248/62 |
| 6,109,765 A * | 8/2000 | Blanton | .................... | F21S 4/10 362/396 |
| 7,900,419 B2 * | 3/2011 | Kodi | ........................ | E04C 5/20 52/719 |
| 8,776,328 B2 * | 7/2014 | Kodi | ....................... | E04C 5/163 24/339 |
| 2014/0259620 A1* | 9/2014 | Hicks | ....................... | F16L 3/233 29/525.01 |
| 2015/0026955 A1* | 1/2015 | Rodrigue | ................ | F16L 3/237 248/72 |
| 2017/0227141 A1* | 8/2017 | Toll | ....................... | F16L 3/1075 |

* cited by examiner

*Primary Examiner* — Muhammad Ijaz
(74) *Attorney, Agent, or Firm* — Lyman Smith; Patent Service Associates, Inc.

(57) ABSTRACT

A device, that can attach near a distal end of a cord, has a receptacle therein for removably further attaching the device to the cord itself. Thus, a cord on a tool, for example, can be wrapped around the tool or a cord storage area of the tool and the end of the cord can be removably clipped onto the cord itself, thus removing the need to wrap or tie the end of the cord while keeping the cord from tangling or unwrapping. Typically, the device is permanently affixed to the cord, near its distal end. Various means can be used to secure the device to the cord, including adhesive, a locking mechanism, friction, or combinations thereof.

18 Claims, 14 Drawing Sheets

CORD CUFF FOR SECURING AN END OF A CORD

CROSS-REFERENCE TO RELATED APPLICATIONS

This application claims the benefit of priority of U.S. provisional patent application No. 63/065,391, filed Aug. 13, 2020, the contents of which are herein incorporated by reference.

BACKGROUND OF THE INVENTION

1. Field of the Invention

One or more embodiments of the invention relates generally to cord organization and safety devices. More particularly, the invention relates to device that can attach to an end of a cord, rope, wire, or the like, and permit that end to be affixed back to the cord itself.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Cords, ropes, wires and the like are often coiled for storage. Ends of the cords often hang loose, which can cause uncoiling or tangling of the cord. For example, a power cord on a tool may be stored wrapped around the tool. However, without a way to secure the end of the cord, the user is often left moving the end of the cord in and out of the wrapped cord to try to secure it. This, however, is ineffective and often knots the cord.

As can be seen, there is a need for a device to store and organize ends of cords.

SUMMARY OF THE INVENTION

Embodiments of the present invention provide a device for attachment to a cord, comprising a first body member having a first opening; a second body member having a second opening; the first body member attached integrally to the second body member; and a closing mechanism permitting the second body member to be fixed to the cord inside the second body member, wherein the first opening permits removable attachment of the first body member to the cord.

Embodiments of the present invention further provide a method for securing a distal end of a cord, comprising placing the distal end of the cord through a second opening formed in a second semi-circle body member; securing the second opening to the cord; attaching a first opening of a first semi-circle body member onto a portion of the cord, thus securing the distal end of the cord onto the cord itself, wherein the first semi-circle body member is attached integrally to the second semi-circle body member.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
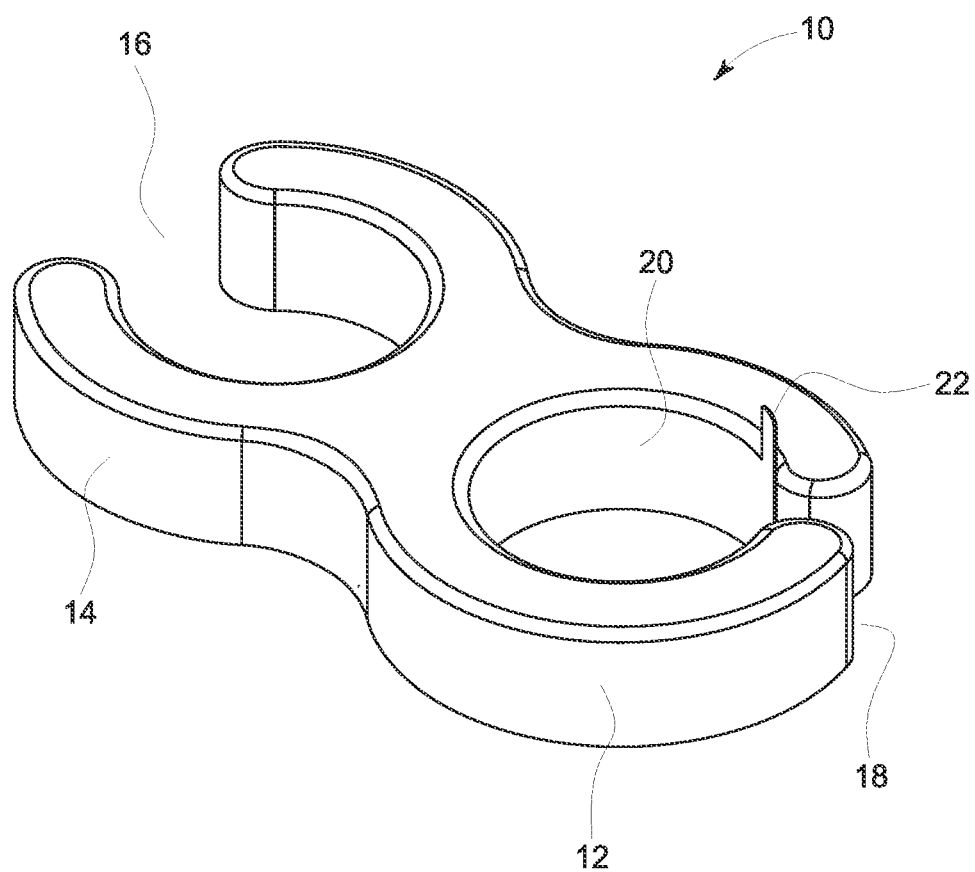
FIG. 1 is a perspective view of a cord cuff according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

Detailed Description of the Preferred Embodiments and Best Mode of Invention The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any device, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a device that can attach near a distal end of a cord. The device has a receptacle therein for removably attaching the device to the cord itself. Thus, a cord on a tool, for example, can be wrapped around the tool or a cord storage area of the tool and the end of the cord can be removably clipped onto the cord itself, thus removing the need to wrap or tie the end of the cord while keeping the cord from tangling or unwrapping. Typically, the device is permanently affixed to the cord, near its distal end. Various means can be used to secure the device to the cord, including adhesive, a locking mechanism, friction, hook and loop fastener, or combinations thereof.

Figure 2:
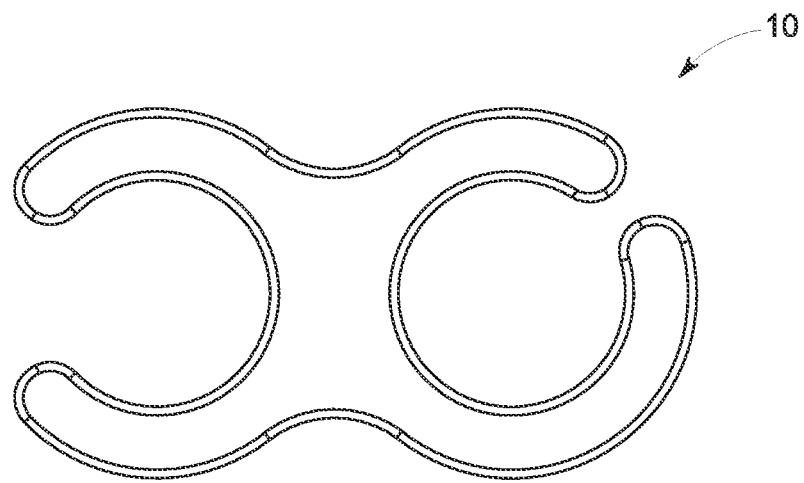
FIG. 2 is a top view of the cord cuff of FIG. 1.
Figure 3:
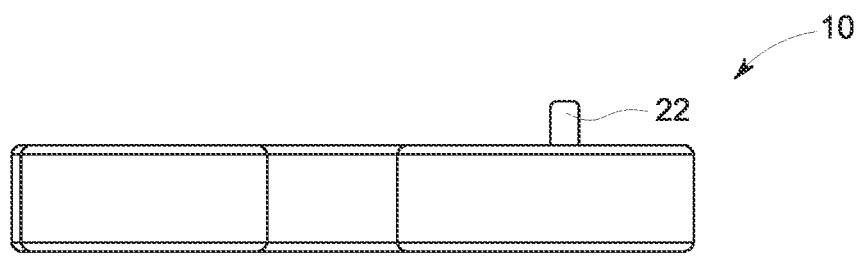
FIG. 3 is a side view of the cord cuff of FIG. 1.

Referring to FIGS. 1 through 3, a cord cuff 10 is generally shown. The cord cuff can be a single, integral component having a first semi-circle 14 attached to a second semi-circle 12. In some embodiments, each of the first and second semi-circles 14, 12 have an opening 16, 18 from an exterior thereof to an interior thereof. The opening 16 on the first semi-circle 14 may be larger than the opening 18 on the second semi-circle 12.

Figure 4:
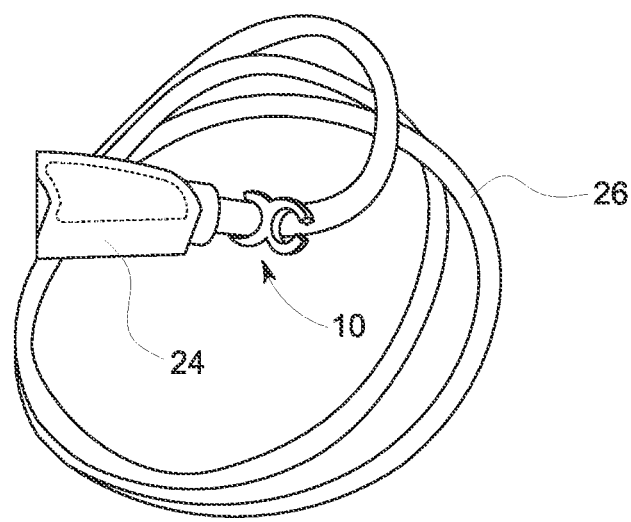
FIG. 4 is a view of a cord with the cord cuff attached thereto, with the removable end unattached to the cord.
Figure 5:
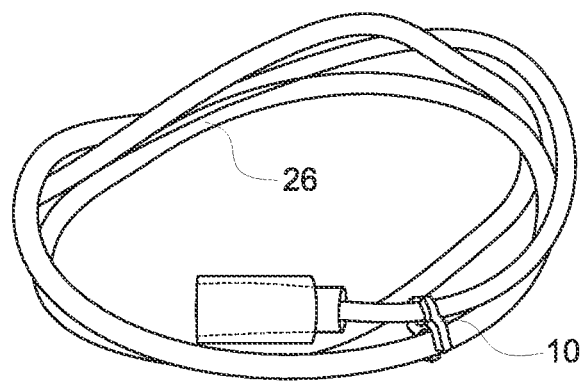
FIG. 5 is a view of the cord of FIG. 4 with the removable end of the cord cuff attached to the cord to secure it thereto.

An adhesive 20 may be disposed on an inside edge of the second semi-circle 12 for securing to a cord 26 (see FIGS. 4 and 5). As used herein, the term "cord" may be used to generically describe any elongated, flexible member, such as rope, cord, fabric, wire, or the like. The adhesive 20 can be initially covered with a protective cover material. During use, the cover may be removed to expose the adhesive 20 for attachment to an end of a cord. The cover may include a pull tab 22 to assist in its removal.

The opening 16 on the first semi-circle 14 may be large enough to permit the cord 26 to pass through to be removably secured to the cord itself. The cord 26, near its distal end 24, can be attached to the inside of the second semi-circle 12 with the adhesive 20.

For example, as shown in FIGS. 4 and 5, the device 10 can be attached to the distal end 24 of the cord 26 and may remain on the cord during ordinary use thereof. When the cord of looped for storage, for example, the device can clip back on the cord to keep the distal end 24 attached to the cord 26, thus maintaining the loop and helping to prevent tangling and unraveling thereof. For two-ended cords, such as lead cords, the device 10 can be placed on both ends to secure both ends back onto the loops of the cord. For one-ended cords, such as those integrated into a tool, for example, a single device 10 can be used.

In another embodiment, a rope may be run between two eye hooks, tied off to each end. One (or both) ends of the cord may hang loosely from the eye hook, while the cord extends between the eye hooks. The cord cuff may be applied to a loose end and the rope may be hung along the spanning section of the cord itself, thus preventing hanging loose ends, which may be a trip hazard.

In some embodiments, the opening 16 on the first semi-circle 14 may be smaller than a diameter of the cord 26, where a flexibility of the first semi-circle 14 permits the diameter of the cord 26 to pass through the opening 16 to removably affix the device to the cord 26. In either case, the diameter of the first semi-circle 16 may be the same diameter, slightly larger or slightly smaller in diameter as compared to the diameter of the cord. When the diameter of the first semi-circle 16 is larger than the cord, the opening 16 may still be smaller than the cord, thus retaining the device on the cord.

The second semi-circle may have an opening that is smaller than a diameter of the cord, but, due to its flexibility, allows the cord to pass through the opening. Typically, when the cord cuff is attached to the cord via the adhesive in the second semi-circle, the cord cuff is retained in position at the end of the cord. In this way, when the cord is coiled (for example, as in FIGS. 4 and 5), the cord cuff is readily available to attach to the cord itself.

In some embodiments, the opening of the first semi-circle may be opposite the attachment of the first semi-circle with the second semi-circle. The opening of the second semi-circle may be offset from this opposite configuration. The offset may be from about 20 to about 90 degrees. Of course, other configurations may be contemplated within the scope of the present invention depending on the particular application.

Figure 6:
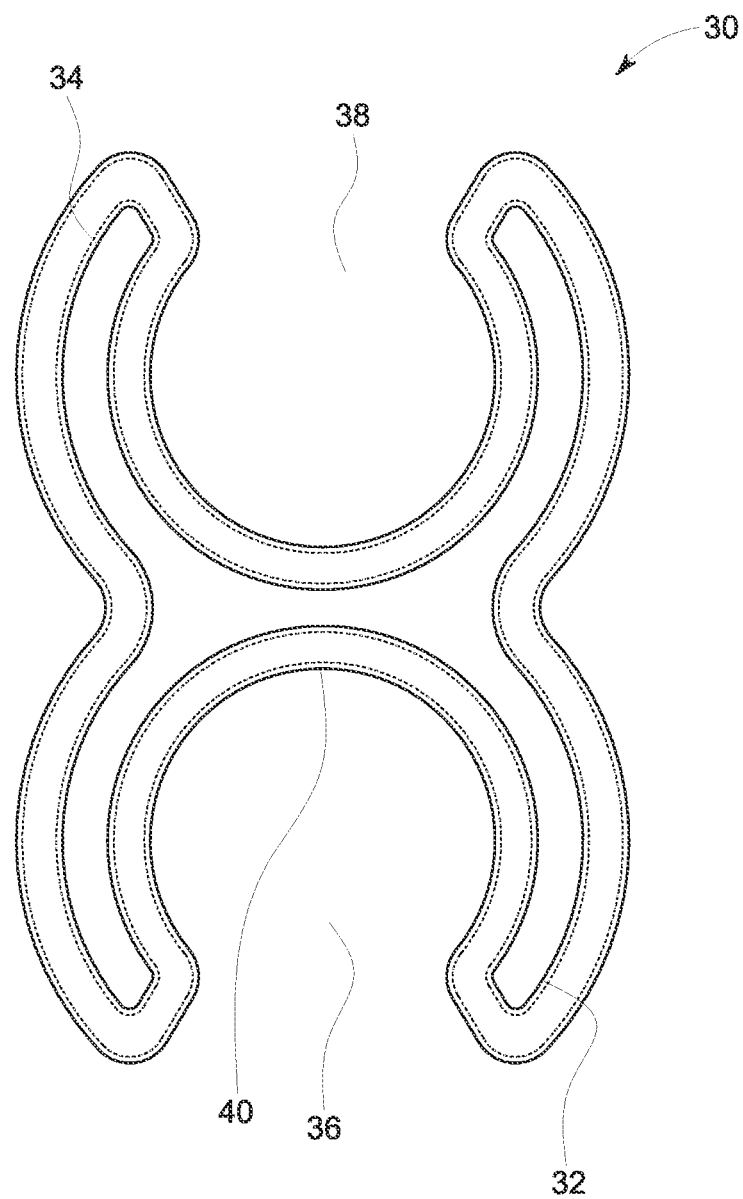
FIG. 6 is a top view of a cord cuff according to an exemplary embodiment of the present invention.
Figure 7:
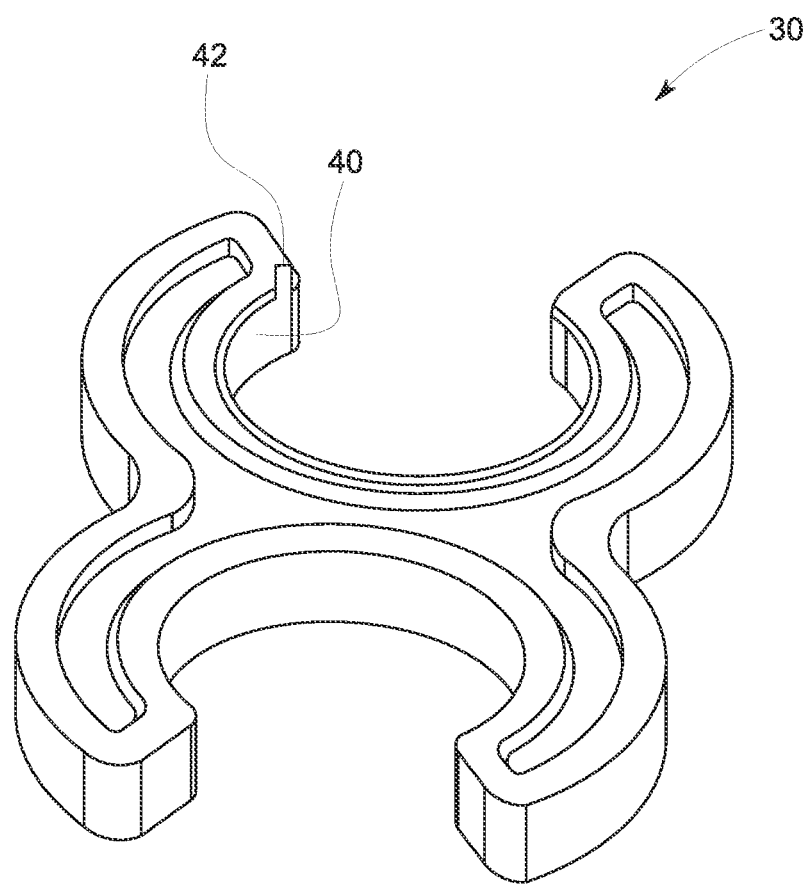
FIG. 7 is a perspective view of the cord cuff of FIG. 6.

Referring to FIGS. 6 and 7, a device 30 can have a first semi-circle 34 and a second semi-circle 32 with openings 38, 36 that are the same size. The device 30 would perform in a similar manner to that of device 10 described above. An adhesive 40 can be applied to the second semi-circle 32, with a pull tab 42 for ease of removal of an adhesive cover, similar to that describe above, for example.

Figure 8:
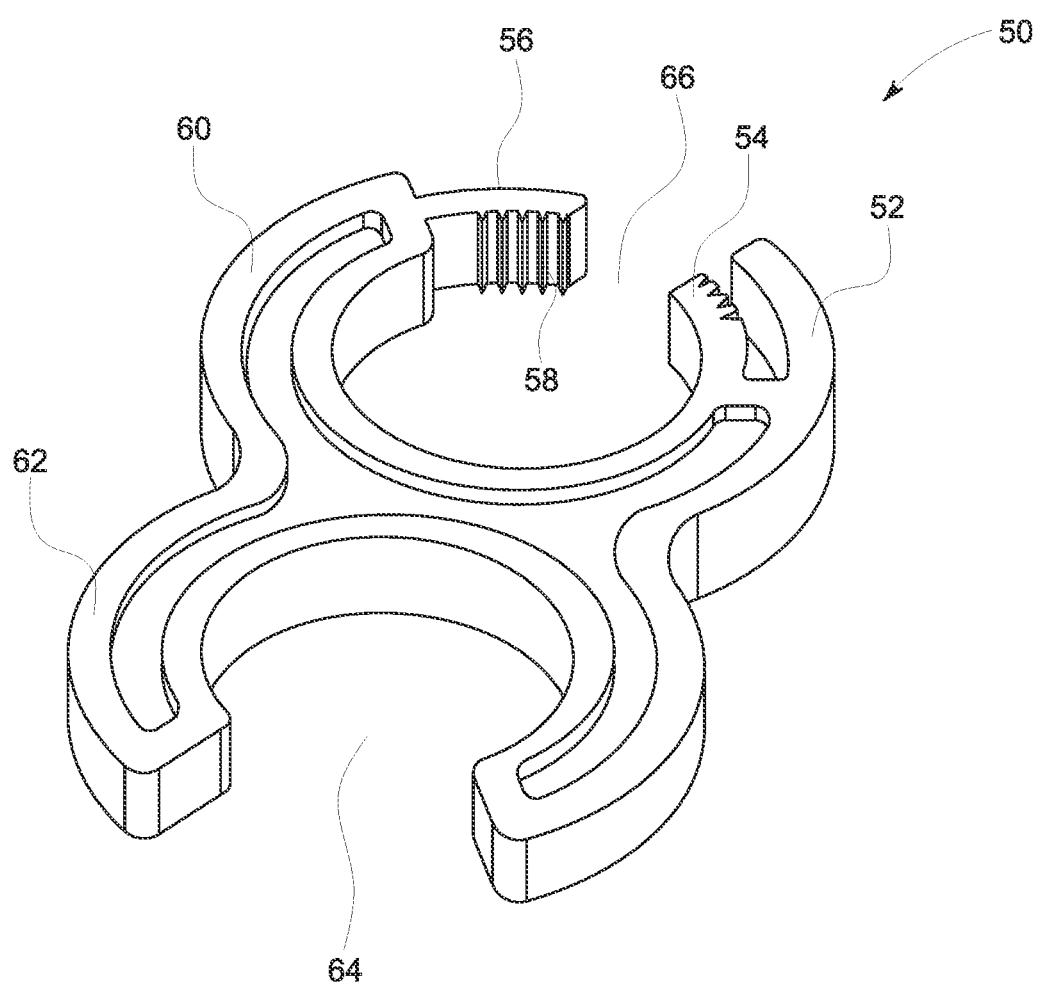
FIG. 8 is a perspective view of a cord cuff according to an exemplary embodiment of the present invention.
Figure 9:
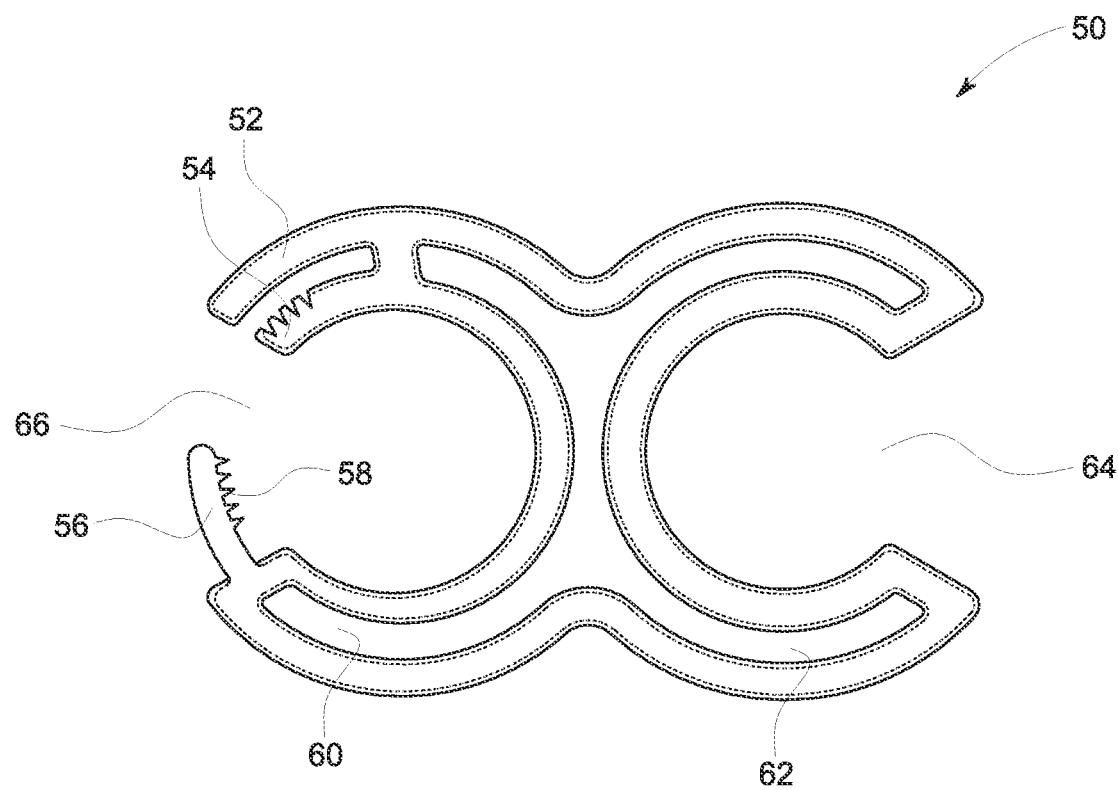
FIG. 9 is a top view of the cord cuff of FIG. 8.

Referring to FIGS. 8 and 9, a device 50 can include a first semi-circle 62 and a second semi-circle 60, similar to that described above with respect to devices 10, 30. The opening 64 on the first semi-circle can be configured to removably receive a cord therein. The opening 66 can be designed to receive a cord therein and secure to the cord.

A male barbed end 56 can extend from one end of the second semi-circle 60 and a female barbed receptacle 52 can be formed in an opposite end of the second semi-circle Barbs 58 of the male barbed end 56 can engage with teeth 54 of the female barbed receptacle 52 after the cord is placed through the opening 66. The male barbed end 56 and the female barbed receptacle 52 can be closed to connect the device 50 onto the cord. With the male/female ends 56, 52, the diameter of the second semi-circle 60 can be adjusted to fit on cords with different diameters, depending on how many barbs 58 are moved to engage with the teeth 54 when closing the second semi-circle 60 on the cord.

Figure 10:
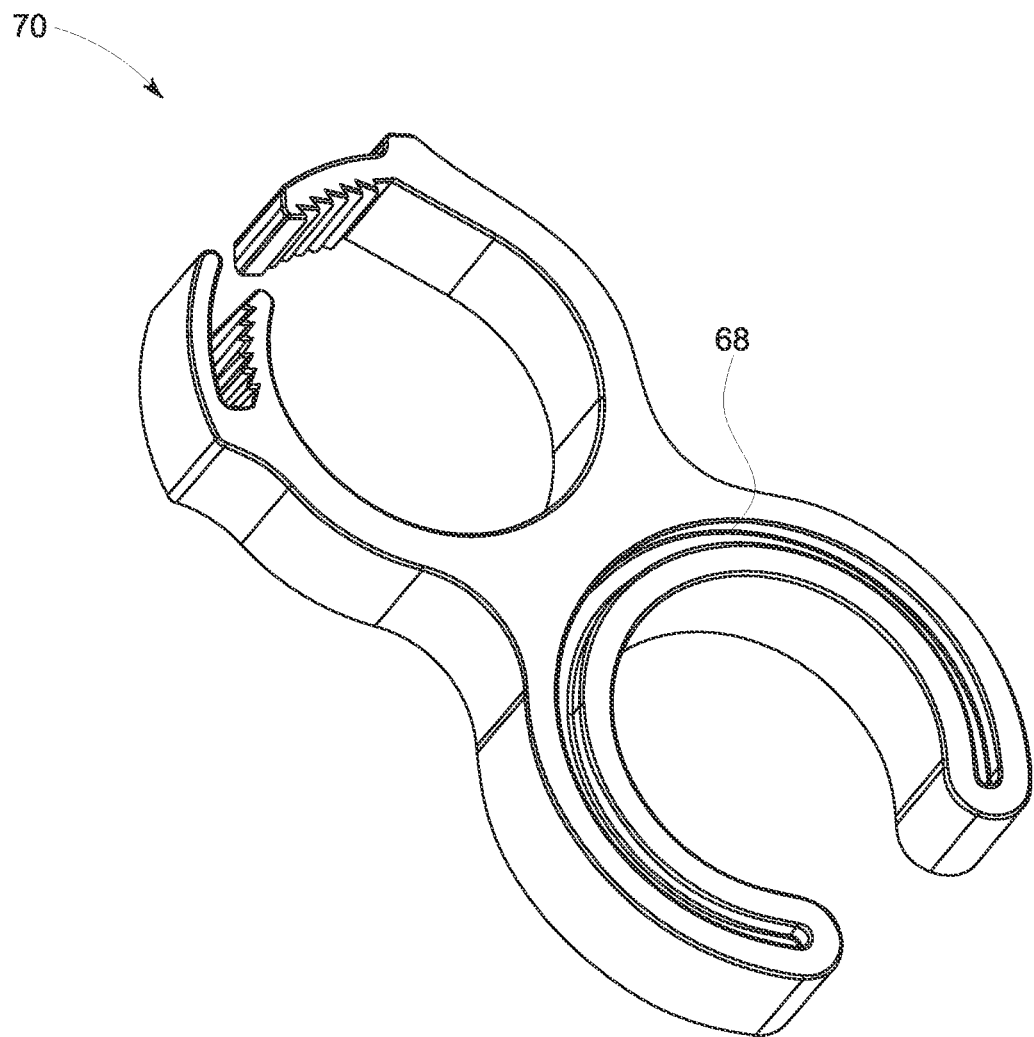
FIG. 10 is a perspective view of a cord cuff according to an exemplary embodiment of the present invention.

Referring to FIG. 10, a device 70 can be similar to the device 50, however, only the first semi-circle end includes a groove 68 formed therein. Such a design could permit greater flexibility in the second semi-circle end, where the barbed connection is made.

Figure 11:
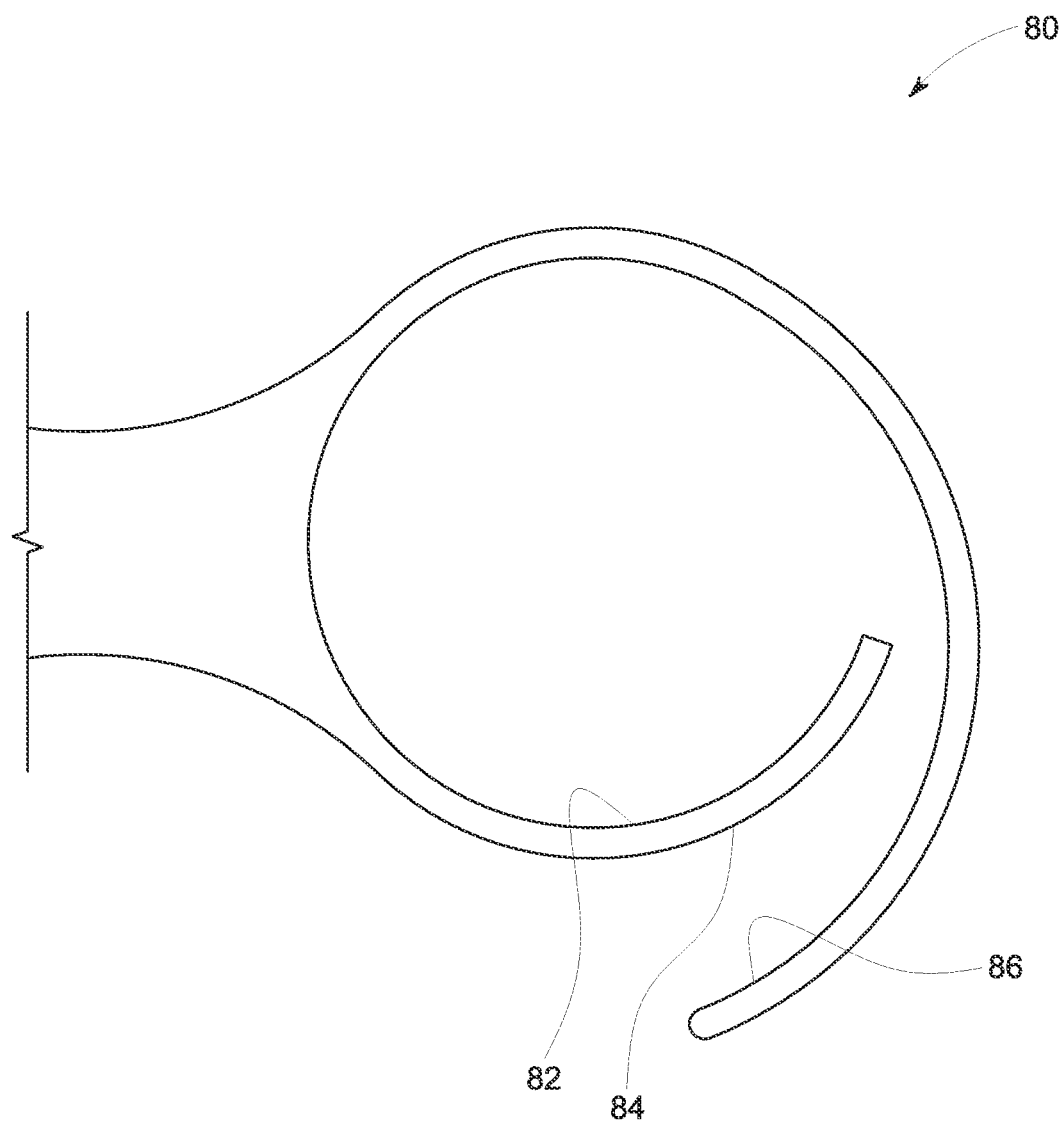
FIG. 11 is detailed top view of a cord cuff having an overlapping arm configuration for its fixable end, according to an exemplary embodiment of the present invention.
Figure 12:
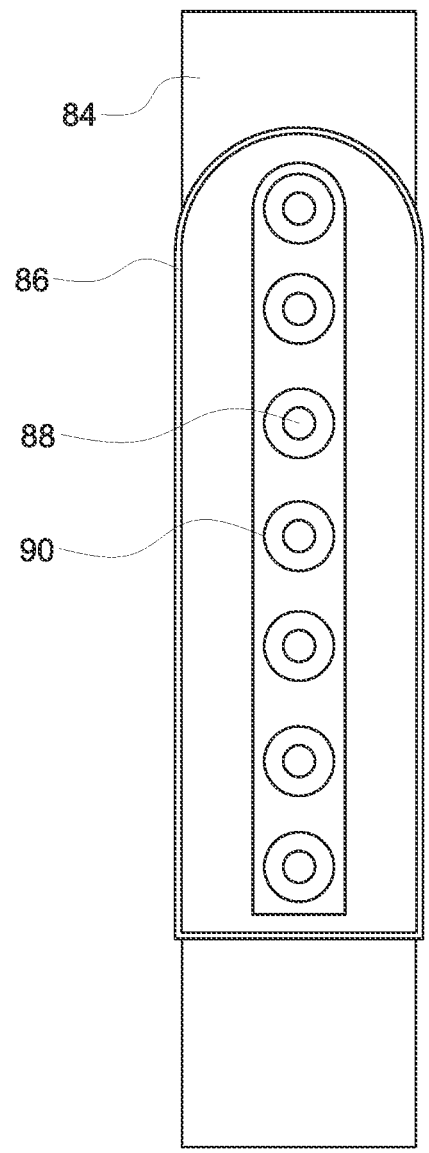
FIG. 12 is a detailed top view of a pin and hole attachment mechanism for the overlapping arm configuration of FIG. 11.
Figure 13:
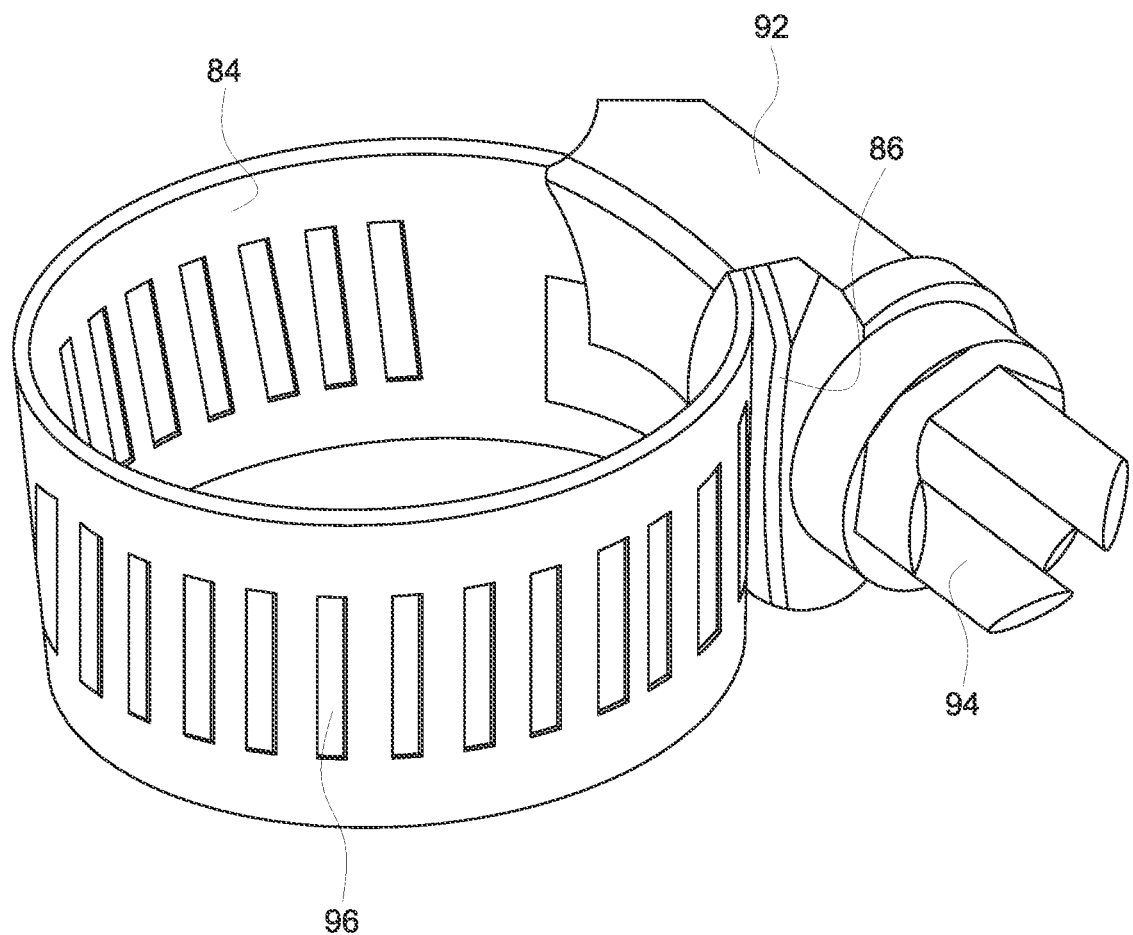
FIG. 13 is a screw clamp illustrating a screw clamp design for the fixable end of the cord cuff, according to an exemplary embodiment of the present invention.

While a barbed connection is shown in FIGS. 8 through 10, other adjustable connections, as may be known in the art, may be used. For example, as shown in FIG. 11, the second side 80 of a device similar to those described above (having a first side, not shown, that can removably attach to the cord) can be affixed to a cord. The second side 80 can have two arms, a shorter arm 84 and a longer arm 86 that extends beyond an end of the shorter arm 84. The arms 84, 86 can form an opening into which the cord is placed. An adhesive 82 can be disposed on an inside surface of the shorter arm 84 and at least a portion of the longer arm 86 to adhere the second side 80 to the cord. The arms 84, 86 can overlap and connect to each other in various manners, such as with a pin 88 and hole 90 type connection, as illustrated in FIG. 12, a ratcheting connection, or an adjustable screw connection 92, as illustrated in FIG. 13, where the arms 82, 86 may have notches 96 or the like to permit the screw connection 92 to tighten or loosen the second end on the cord. With the embodiments of FIGS. 12 and 13, adhesive may or may not be used, where friction from tightening the arms 84, 86 about the cord can fix the device on the cord.

In some embodiments, an adhesive, as described above with respect to devices 10, may be applied to an interior of the second semi-circle 60 to help further secure the second semi-circle 60 to the cord.

Figure 14A:
FIGS. 14A through 14C are views of a hole and pin connection for the fixable end of the cord cuff, according to an exemplary embodiment of the present invention.
Figure 14B:
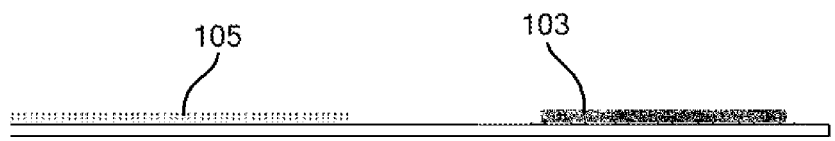
Figure 14C:
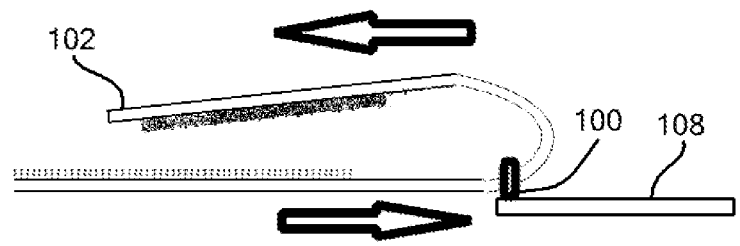
Figure 15A:
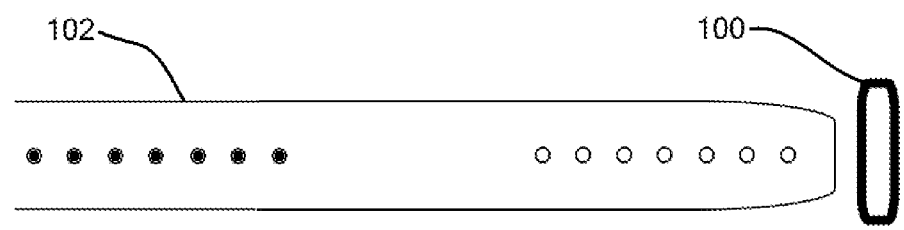
FIGS. 15A through 15C are views of a hook and loop fastener connection for the fixable end of the cord cuff, according to an exemplary embodiment of the present invention.
Figure 15B:
Figure 15C:
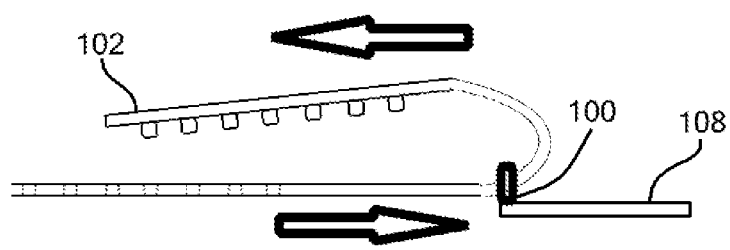

As shown in FIG. 14A-C and FIG. 15A-C, a loop 100 may be formed on one arm 108 of the cord cuff device (not shown, only the arms are shown, where the arms would form the fixable part of the cord cuff, which would be integrally formed with the end that removably attaches to the cord.). The second arm 102 may be elongated to fit into the loop 100 and attach back onto itself. Various mechanisms may be used in this design. For example, hook and look fastener 103, 105 may be disposed on the second arm 102 so that it may connect back onto itself after passing through the loop 100 as shown in FIGS. 14A-14C. In some embodiments, as shown in FIGS. 15A-15C, pins 104 may fit into holes 106, where multiple pins 104 and/or holes 106 can be provided for size adjustment as shown in FIGS. 15A-C.

Figure 16:
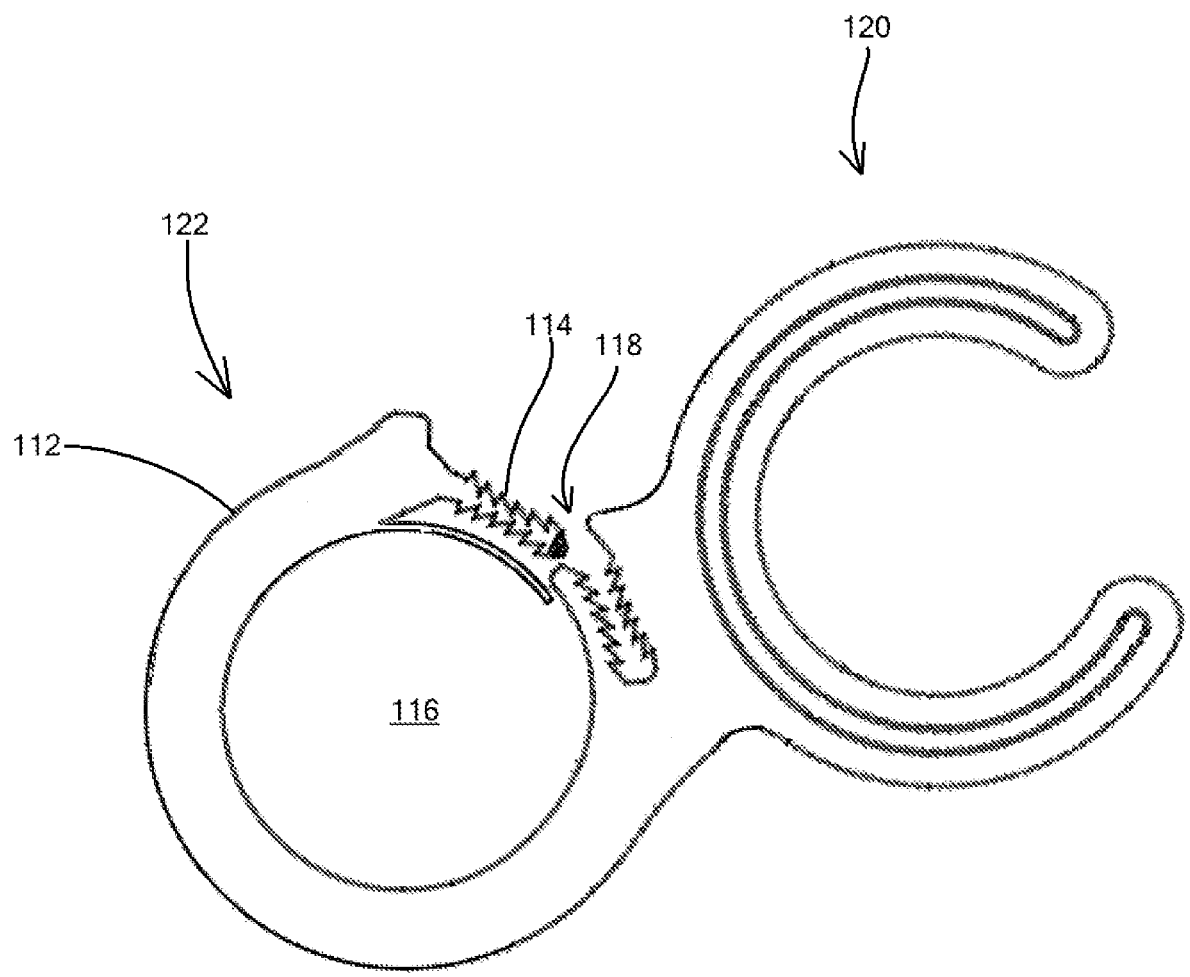
FIG. 16 is a top view of a cord cuff with an adjustable tooth connector formed in a mid-portion of the fixable end, according to an exemplary embodiment of the present invention.

In some embodiments, the fixable end 122 of a cord cuff device 110, as shown in FIG. 16, may include one arm 112 with teeth 114 which forms nearly an entirety of the opening 116 into which the cord is secured. The teeth 114 may fit into a tooth receiving slot 118 which may be formed near or at the location where the removable end 120 is integrally attached to the fixable end 122.

The cord cuff may be sized to fit various sizes of cords, depending on the particular application.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A device for attachment to a cord, comprising:
   a device body defined as a planar element having a first end and a second end opposite the first end;
   a first body member defined by the first end of the device body, the first body member having a first opening permitting access to a first space defined by the first end of the device body;
   a second body member defined by the second end of the device body, the second body member having a second opening permitting access to a second space defined by the second end of the device body; and
   a closing mechanism configured to fix the second body member to a first location along the cord when the cord is disposed inside the second opening of the second body member, wherein
   the first opening configured to removably secure the first body member to a second location of the cord;
   the first space and the second space have a diameter that is greater than a thickness of the device body, the thickness of the device body defined in a direction orthogonal to a direction of the planar element of the device body; and
   the first opening and the second opening are disposed at opposite sides of the device body, wherein the second body member is formed as a semi-circle terminating in first and second ends, the device further comprising:
a first connection mechanism formed on the first end of the second body member; and
a second connection mechanism formed on the second end of the second body member, wherein
the first connection mechanism is operable to engage with the second connection mechanism to close the opening of the second body member.

2. The device of claim 1, wherein the closing mechanism includes an adhesive formed along an interior surface of the second body member.

3. The device of claim 2, further comprising a pull tab to remove a cover from the adhesive prior to attachment to the cord.

4. The device of claim 1, wherein the closing mechanism includes a first arm and a second arm overlapping the first arm, the first arm being fixable to the second arm.

5. The device of claim 4, further comprising an adjustable arm connection mechanism configured to connect the first arm with the second arm at a user-adjustable position.

6. The device of claim 1, wherein the first opening faces away from the second opening.

7. The device of claim 6, wherein the first opening faces a first direction and the second opening faces a second direction, the first direction being about 180 degrees from the second direction.

8. The device of claim 6, wherein the first opening faces a first direction and the second opening faces a second direction, the first direction being less than 180 degrees from the second direction.

9. The device of claim 1, wherein the first connection mechanism is operable to adjustably engage with the second connection mechanism to close the opening of the semi-circle to permit a range of diameter for the semi-circle.

10. The device of claim 1, wherein the first connection mechanism is a barbed male end and the second connection mechanism is an opening with teeth formed therein, the barbed male end configured to engage with the teeth of the opening.

11. The device of claim 1, wherein the semi-circle is formed from a material having a flexibility greater than the first body member.

12. The device of claim 1, wherein the first opening and the second opening provide an entirety of attachment points on the device.

13. A device for attachment to a cord, comprising:
a device body having only a first opening and a second opening, the first opening providing access to a first space partially defined by the device body, and the second opening providing access to a second space partially defined by the device body; and
a closing mechanism configured to fix a first location along the cord within the second space when the cord is disposed within the second space, wherein
the first space is configured to removably secure a second location of the cord within the first space; and
the first space and the second space are partially surrounded by respective first and second surrounding portions of the device body the first and second surrounding portions each extending along a single plane, a thickness of the first and second surrounding portions being less than a diameter of the first and second openings, the thickness being defined in a direction orthogonal to each of the single plane,
wherein the first opening is defined between ends of a first arm and a second arm of the device body, the first arm and the second arm being resiliently movable to permit the first location of the cord to be secured within the first space.

14. The device of claim 13, wherein the first space and the second space have the same diameter.

15. The device of claim 13, wherein the closing mechanism includes a first arm and a second arm overlapping the first arm, the first arm being fixable to the second arm.

16. The device of claim 13, wherein the second space is formed as a semi-circle terminating in first and second ends, the device further comprising:
a first connection mechanism formed on the first end of the second opening; and
a second connection mechanism formed on the second end of the second opening, wherein
the first connection mechanism is operable to engage with the second connection mechanism to close the second opening of the second space.

17. The device of claim 16, wherein the first connection mechanism is operable to adjustably engage with the second connection mechanism to close the opening of the second space to permit a range of diameter for the second space.

18. The device of claim 16, wherein the first connection mechanism is a barbed male end and the second connection mechanism is an opening with teeth formed therein, the barbed male end configured to engage with the teeth of the opening.

* * * * *